US009509832B2

(12) United States Patent
Adams et al.

(10) Patent No.: US 9,509,832 B2
(45) Date of Patent: Nov. 29, 2016

(54) RECOMMENDING PREFERRED RINGER SETTINGS FOR A MOBILE COMMUNICATIONS DEVICE

(71) Applicant: LENOVO ENTERPRISE SOLUTIONS (SINGAPORE) PTE. LTD., Singapore (SG)

(72) Inventors: Keith T. Adams, Cary, NC (US); Jeffrey R. Hamilton, Pittsboro, NC (US); Ross L. Mickens, Cary, NC (US); Markesha F. Parker, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 48 days.

(21) Appl. No.: 14/096,084

(22) Filed: Dec. 4, 2013

(65) Prior Publication Data
US 2015/0156310 A1 Jun. 4, 2015

(51) Int. Cl.
H04M 1/00 (2006.01)
H04M 3/00 (2006.01)
H04B 1/38 (2015.01)
H04M 1/725 (2006.01)
(Continued)

(52) U.S. Cl.
CPC ......... *H04M 1/72572* (2013.01); *H04M 19/04* (2013.01); *H04W 4/021* (2013.01)

(58) Field of Classification Search
CPC .................. H04W 48/04; H04W 4/00–4/02; H04W 4/06; H04W 4/08; H04W 4/16; H04W 4/185; H04W 4/20; H04W 4/203; H04W 4/206; H04W 8/18–8/245; H04W 28/0226; H04M 1/72572; H04M 1/72577; H04M 1/663
See application file for complete search history.

(56) References Cited

U.S. PATENT DOCUMENTS 6,754,504 B1 * 6/2004 Reed .................. G06Q 50/00
455/414.1
8,086,265 B2 12/2011 White
(Continued)

FOREIGN PATENT DOCUMENTS

CN 102035945 A 4/2011
CN 102655541 A 9/2012
WO WO/00/65865 A1 11/2000

OTHER PUBLICATIONS

Liang, H. S., et al., "Ringtune: Learning-Based Context-Sensitive Implementation for Ringtone Volume Adjustment", Data Mining Final Project, Department of Electrical Engineering, National Taiwan University, (online), [accessed Aug. 2, 2013], 4 Pages, URL: http://mrorz.github.io/files/ringtune.pdf.
(Continued)

*Primary Examiner* — San Htun
(74) *Attorney, Agent, or Firm* — Brandon C. Kennedy; Katherine S. Brown; Kennedy Lenart Spraggins LLP

(57) ABSTRACT

Recommending preferred ringer settings for a mobile communications device, including: receiving, from one or more mobile communications devices, location information identifying a location of the mobile communications device; receiving, from one or more mobile communications devices, ringer setting information identifying a ringer setting of the mobile communications device; identifying one or more location zones; and determining, in dependence upon the location information and the ringer setting information, preferred ringer settings for each of the one or more location zones.

11 Claims, 5 Drawing Sheets

(51) Int. Cl.
*H04W 4/02* (2009.01)
*H04M 19/04* (2006.01)

(56) References Cited

U.S. PATENT DOCUMENTS

| | | | |
|---|---|---|---|
| 8,335,324 B2 | 12/2012 | Zhang et al. | |
| 2002/0198004 A1* | 12/2002 | Heie | H04W 4/02 |
| | | | 455/456.1 |
| 2006/0063563 A1 | 3/2006 | Kaufman | |
| 2008/0113657 A1* | 5/2008 | Abu-Amara et al. | 455/415 |
| 2008/0146212 A1* | 6/2008 | Aaron | H04M 3/38 |
| | | | 455/419 |
| 2008/0159522 A1* | 7/2008 | Ericson | H04M 19/04 |
| | | | 379/373.02 |
| 2008/0171559 A1* | 7/2008 | Frank | G06Q 30/02 |
| | | | 455/456.5 |
| 2009/0186633 A1* | 7/2009 | Yonker | H04M 1/72572 |
| | | | 455/456.6 |
| 2010/0223095 A1* | 9/2010 | Ranta | G06Q 10/109 |
| | | | 705/7.31 |
| 2011/0300838 A1* | 12/2011 | Coleman | G06Q 30/0242 |
| | | | 455/414.2 |
| 2011/0312333 A1* | 12/2011 | I'Anson | H04W 8/245 |
| | | | 455/456.1 |
| 2012/0065802 A1 | 3/2012 | Seeber et al. | |
| 2012/0172027 A1* | 7/2012 | Partheesh | H04W 4/021 |
| | | | 455/420 |
| 2013/0326209 A1* | 12/2013 | Dommalapati | G06F 9/4421 |
| | | | 713/100 |
| 2014/0066018 A1* | 3/2014 | Zhu | H04W 4/008 |
| | | | 455/411 |
| 2014/0295805 A1* | 10/2014 | Filev | H04M 1/72569 |
| | | | 455/414.1 |

OTHER PUBLICATIONS

Motorola, Inc., "Automatic Mobile Phone Ringer Volume Adjustment Under Noisy Environment", IP.com Prior Art Database, Apr. 6, 2001, pp. 1-3, IP.com No. IPCOM000004689D, URL: http://ip.com/IPCOM/000004689.

* cited by examiner

RECOMMENDING PREFERRED RINGER SETTINGS FOR A MOBILE COMMUNICATIONS DEVICE

BACKGROUND OF THE INVENTION

Field of the Invention

The field of the invention is data processing, or, more specifically, methods, apparatus, and products for recommending preferred ringer settings for a mobile communications device.

Description of Related Art

Mobile communications devices, such as smartphones, have become widely used as a large number of people currently own such mobile communications devices. Such mobile communications devices can alert the user of the mobile communications device to an incoming communications message, such as a text message, an incoming phone call, an incoming electronic mail message, and so on. Mobile communications devices can alert the user of the mobile communications device to an incoming communications message, for example, through the use of a 'ringer' that produces audible sound via an embedded speaker. In many situations, however, the production of audible sound via an embedded speaker may be inappropriate. For example, the production of audible sound via an embedded speaker may be inappropriate when a user of the mobile communications device is taking a test, attending a wedding, attending a church sermon, and so on. In other situations, disabling the production of audible sound via an embedded speaker may cause the user of the mobile communications device to miss an important incoming data communications message.

SUMMARY OF THE INVENTION

Methods, apparatuses, and products for recommending preferred ringer settings for a mobile communications device, including: receiving, from one or more mobile communications devices, location information identifying a location of the mobile communications device; receiving, from one or more mobile communications devices, ringer setting information identifying a ringer setting of the mobile communications device; identifying one or more location zones; and determining, in dependence upon the location information and the ringer setting information, preferred ringer settings for each of the one or more location zones.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
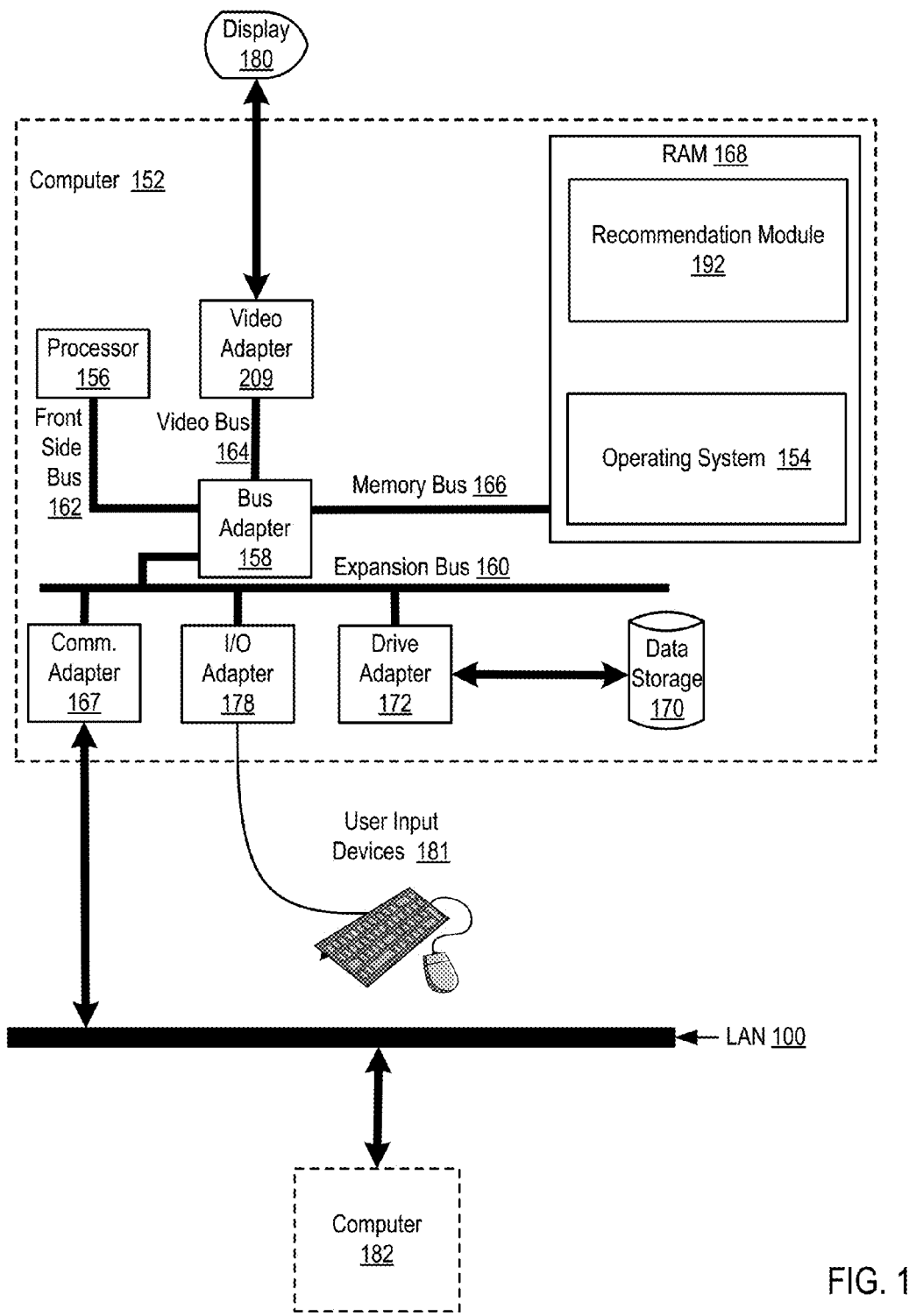
FIG. 1 sets forth a block diagram of automated computing machinery comprising an example computer useful in recommending preferred ringer settings for a mobile communications device according to embodiments of the present invention.

Example methods, apparatuses, and products for recommending preferred ringer settings for a mobile communications device in accordance with the present invention are described with reference to the accompanying drawings, beginning with FIG. 1. FIG. 1 sets forth a block diagram of automated computing machinery comprising an example computer (152) useful in recommending preferred ringer settings for a mobile communications device according to embodiments of the present invention. The computer (152) of FIG. 1 includes at least one computer processor (156) or 'CPU' as well as random access memory (168) (RAM') which is connected through a high speed memory bus (166) and bus adapter (158) to processor (156) and to other components of the computer (152).

Stored in RAM (168) is a recommendation module (192), a module of computer program instructions for recommending preferred ringer settings for a mobile communications device according to embodiments of the present invention. Such a mobile communications device may be embodied as a smartphone, as a personal digital assistant, as a tablet computer, or as any other computing device configured to use a ringer to notify a user of the mobile communications device of an incoming communications message. The ringer settings for such a mobile communications device may be used to specify the manner in which the mobile communications device may deliver a notification of an incoming communications message to the user of the mobile communications device. The ringer settings may indicate, for example, that the mobile communications device should deliver a notification of an incoming communications message to the user through the use of a 'vibrate' mode where the mobile communications device vibrates without delivering an audible signal, that the mobile communications device should deliver a notification of an incoming communications message to the user through the use of an audible signal delivered by an embedded speaker according to a particular volume setting, that the mobile communications device should deliver a notification of an incoming communications message to the user through the use of a 'silent' mode where the mobile communications device neither vibrates nor emits an audible signal, and so on.

The recommendation module (192) of FIG. 1 may be configured to recommend preferred ringer settings for a mobile communications device by receiving, from one or more mobile communications devices, location information identifying a location of the mobile communications device. Location information can include, for example, global position system ('GPS') coordinates for the mobile communications device, an identification of a particular network that the mobile communications device is connected to (e.g., a 'library' network, a 'Starbucks' network, a 'public' network), an identification of wireless router whose location is known that the mobile communications device is connected to, and so on. The location information identifying a location of the mobile communications device may be received from one or more mobile communications devices by the one or more mobile communications devices each sending a message that includes the location information to the recommendation module (192), by the recommendation module (192) polling the one or more mobile communications devices for location information, and so on.

The recommendation module (192) of FIG. 1 may be configured to recommend preferred ringer settings for a mobile communications device by receiving, from one or more mobile communications devices, ringer setting information identifying a ringer setting of the mobile communications device. The ringer setting information may include, for example, information specifying whether an embedded speaker within the mobile communications device is enabled to deliver an audible signal indicating that an incoming communications message has been received, information specifying a volume level for an embedded speaker within the mobile communications device, information specifying whether a vibrate function for the mobile communications device is enabled to cause the mobile communications device to vibrate when an incoming communications message has been received, and so on. The ringer setting information may be received from one or more mobile communications devices by the one or more mobile communications devices each sending a message that includes the ringer setting information to the recommendation module (192), by the recommendation module (192) polling the one or more mobile communications devices for ringer setting information, and so on.

The recommendation module (192) of FIG. 1 may be configured to recommend preferred ringer settings for a mobile communications device by identifying one or more location zones. A location zone can represent a particular area where all locations contained within the location zone are treated as being identical for the purpose of recommending preferred ringer settings. For example, a location zone may represent a large library where all locations within the library are treated as being identical for the purpose of recommending preferred ringer settings. Likewise, a location zone may represent a large football stadium where all locations within the football stadium are treated as being identical for the purpose of recommending preferred ringer settings.

Identifying one or more location zones may be carried out, for example, by identifying areas where mobile communications devices within each area have similar ringer settings. Consider an example in which the recommendation module (192) receives location information and ringer settings information from one hundred mobile communications devices, where the one hundred mobile communications devices are within one hundred yards of each other. In such an example, further assume that 90% of such mobile communications devices indicate that they are set to a 'silent' mode as described above. In such an example, the recommendation module (192) may identify the area containing the one hundred mobile communications devices as a particular location zone, given that relatively uniform ringer settings are adopted by the mobile communications devices within that particular location zone. In such an example, the particular location zone may represent a library, a classroom, a church, a funeral home, a performance hall, or other location where users of mobile communications devices would tend to disable a ringer for the mobile communications device.

The recommendation module (192) of FIG. 1 may be configured to recommend preferred ringer settings for a mobile communications device by determining, in dependence upon the location information and the ringer setting information, preferred ringer settings for each of the one or more location zones. Determining preferred ringer settings for each of the one or more location zones may be carried out using the location information and the ringer setting information received from each of the mobile communications devices that are within a particular location zone, such that the most common ringer settings for the mobile communications devices that are within a particular location zone may be identified. In such a way, the preferred ringer settings for a particular location zone may be set to match the most common ringer settings for the mobile communications devices that are within the particular location zone. Readers will appreciate that the recommendation module (192) may utilize crowd sourcing techniques to determine preferred ringer settings for each of the one or more location zones utilizing ringer setting information retrieved from mobile communication devices within each of the one or more location zones.

Determining preferred ringer settings for each of the one or more location zones may be carried out through the use of selection rules that take into account the ringer setting information for each mobile communications device in a particular location zone. Such ringer selection rules may be configured, for example, to select the most commonly used ringer setting amongst the mobile communications devices in a particular location zone as the preferred ringer settings for mobile communications devices in the particular location zone. Alternatively, the ringer selection rules may be configured to select ringer settings utilized by at least a predetermined threshold percentage of the mobile communications devices in a particular location zone as the preferred ringer settings for mobile communications devices in the particular location zone. The ringer selection rules may give heavier weight to the ringer setting information for particular mobile communications devices such as a mobile communications device designated as an administrator device, a device that has recently changed its ringer settings in view of the fact that the ringer settings for such a mobile communications device are being actively monitored, and so on.

Also stored in RAM (168) is an operating system (154). Operating systems useful recommending preferred ringer settings for a mobile communications device according to embodiments of the present invention include UNIX™, Linux™, Microsoft XP™, AIX™, IBM's i5/OS™, and others as will occur to those of skill in the art. The operating system (154) and the recommendation module (192) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for recommending preferred ringer settings for a mobile communications device according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for recommending preferred ringer settings for a mobile communications device according to embodiments of the present invention include modems for wired dial-up communications, Ethernet (IEEE 802.3) adapters for wired data communications network communications, mobile communications adapters for wireless communications over a telecommunications network such as a long term evolution ('LTE') network, and 802.11 adapters for wireless data communications network communications.

Figure 2:
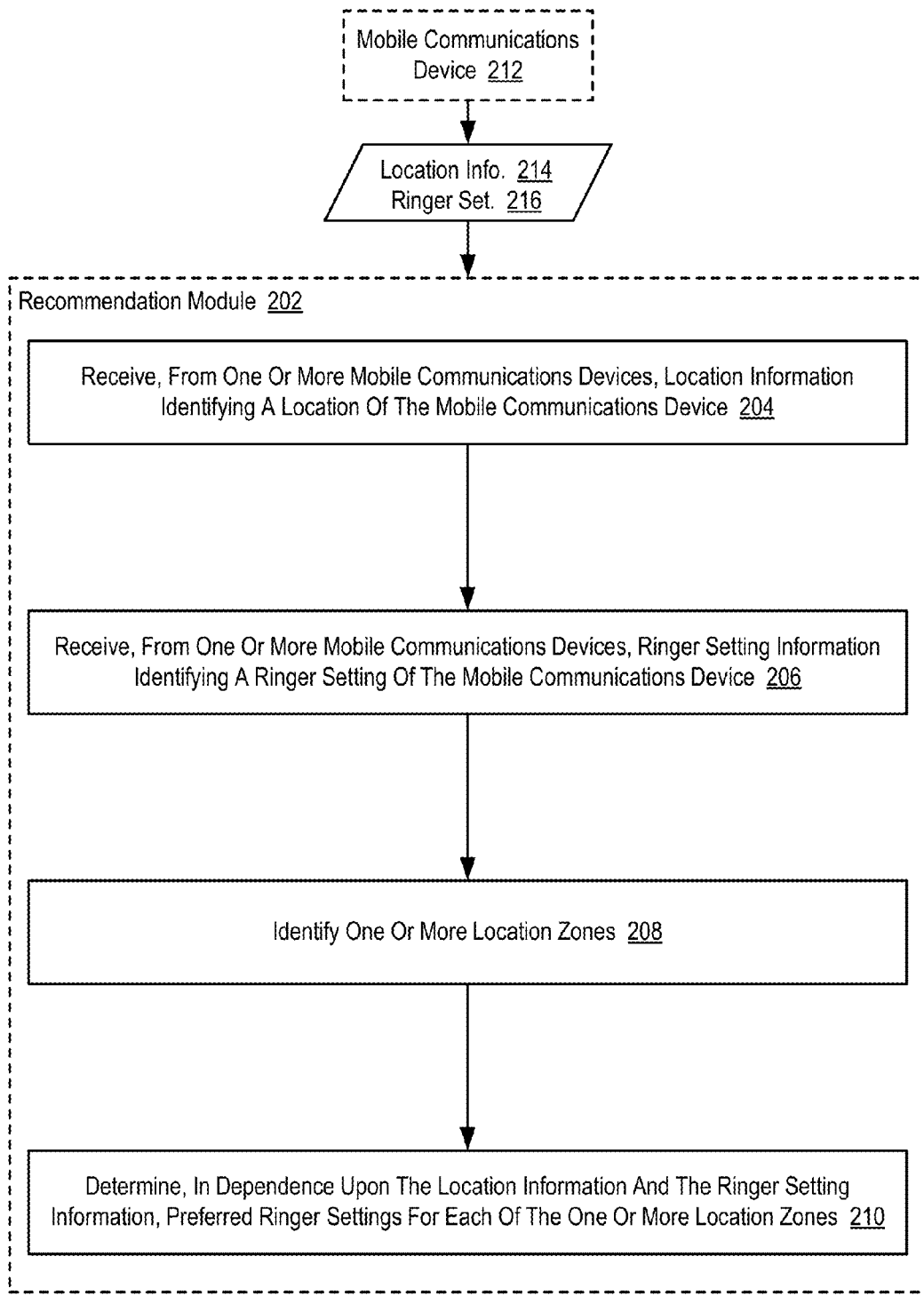
FIG. 2 sets forth a flow chart illustrating an example method for recommending preferred ringer settings for a mobile communications device according to embodiments of the present invention.

For further explanation, FIG. 2 sets forth a flow chart illustrating an example method for recommending preferred ringer settings for a mobile communications device according to embodiments of the present invention. In the example method of FIG. 2, the mobile communications device (212) may be embodied as a smartphone, as a personal digital assistant, as a tablet computer, or as any other computing device configured to use a ringer to notify a user of the mobile communications device (212) of an incoming communications message. The ringer settings for such a mobile communications device (212) may be used to specify the manner in which the mobile communications device (212) may deliver a notification of an incoming communications message to the user of the mobile communications device (212). The ringer settings may indicate, for example, that the mobile communications device (212) should deliver a notification of an incoming communications message to the user through the use of a 'vibrate' mode where the mobile communications device (212) vibrates without delivering an audible signal, that the mobile communications device (212) should deliver a notification of an incoming communications message to the user through the use of an audible signal delivered by an embedded speaker according to a particular volume setting, that the mobile communications device (212) should deliver a notification of an incoming communications message to the user through the use of a 'silent' mode where the mobile communications device (212) neither vibrates nor emits an audible signal, and so on.

The example method of FIG. 2 is depicted as being carried out, at least in part, by a recommendation module (202). The recommendation module (202) of FIG. 2 may be embodied, for example, as a module of computer program instructions executing on computer hardware such as a computer processor. The recommendation module (202) of FIG. 2 may reside, for example, on a server maintained by a provider of mobile communications connectivity such as a telecommunications provider, on a server maintained by a provider of recommended preferred ringer settings for mobile communications devices, and so on.

The example method depicted in FIG. 2 includes receiving (204), from one or more mobile communications devices (212), location information (214) identifying a location of the mobile communications device (212). In the example method depicted in FIG. 2, location information (214) can include, for example, GPS coordinates for the mobile communications device (212), an identification of a particular network that the mobile communications device (212) is connected to (e.g., a 'library' network, a 'Starbucks' network, a 'public' network), an identification of wireless router whose location is known that the mobile communications device (212) is connected to, and so on. In the example method of FIG. 2, the location information (214) identifying a location of the mobile communications device (212) may be received (204) from one or more mobile communications devices (212) by the one or more mobile communications devices (212) each sending a message that includes the location information (214) to the recommendation module (202), by the recommendation module (202) polling the one or more mobile communications devices (212) for location information (214), and so on.

The example method depicted in FIG. 2 also includes receiving (206), from one or more mobile communications devices (212), ringer setting information (216) identifying a ringer setting of the mobile communications device (212). In the example method depicted in FIG. 2, the ringer setting information (216) may include, for example, information specifying whether an embedded speaker within the mobile communications device (212) is enabled to deliver an audible signal indicating that an incoming communications message has been received, information specifying a volume level for an embedded speaker within the mobile communications device (212), information specifying whether a vibrate function for the mobile communications device (212) is enabled to cause the mobile communications device (212) to vibrate when an incoming communications message has been received, and so on. In the example method of FIG. 2, the ringer setting information (216) may be received (206) from one or more mobile communications devices (212) by the one or more mobile communications devices (212) each sending a message that includes the ringer setting information (216) to the recommendation module (202), by the recommendation module (202) polling the one or more mobile communications devices (212) for ringer setting information (216), and so on.

The example method depicted in FIG. 2 also includes identifying (208) one or more location zones. In the example method of FIG. 2, a location zone represents a particular area where all locations contained within the location zone are treated as being identical for the purpose of recommending preferred ringer settings. For example, a location zone may represent a large library where all locations within the library are treated as being identical for the purpose of recommending preferred ringer settings. Likewise, a location zone may represent a large football stadium where all locations within the football stadium are treated as being identical for the purpose of recommending preferred ringer settings.

In the example method of FIG. 2, identifying (208) one or more location zones may be carried out, for example, by identifying areas where mobile communications devices (212) within each area have similar ringer settings. Consider an example in which the recommendation module (202) receives location information and ringer settings information from one hundred mobile communications devices, where the one hundred mobile communications devices are within one hundred yards of each other. In such an example, further assume that 90% of such mobile communications devices indicate that they are set to a 'silent' mode as described above. In such an example, the recommendation module (202) may identify (208) the area containing the one hundred mobile communications devices as a particular location zone, given that relatively uniform ringer settings are adopted by the mobile communications devices within that particular location zone. In such an example, the particular location zone may represent a library, a classroom, a church, a funeral home, a performance hall, or other location where users of mobile communications devices would tend to disable a ringer for the mobile communications device. Alternatively, the particular location zone may represent a loud restaurant, a home, or other location where users of mobile communications devices would tend to enable a ringer for the mobile communications device.

The example method depicted in FIG. 2 also includes determining (210), in dependence upon the location information (214) and the ringer setting information (216), preferred ringer settings for each of the one or more location zones. In the example method of FIG. 2, determining (210) preferred ringer settings for each of the one or more location zones may be carried out using the location information (214) and the ringer setting information (216) received from each of the mobile communications devices (212) that are within a particular location zone, such that the most common ringer settings for the mobile communications devices (212) that are within a particular location zone may be identified. In such a way, the preferred ringer settings for a particular location zone may be set to match the most common ringer settings for the mobile communications devices (212) that are within the particular location zone. Readers will appreciate that the recommendation module (202) may utilize crowd sourcing techniques to determine (210) preferred ringer settings for each of the one or more location zones utilizing ringer setting information (216) retrieved from mobile communication devices (212) within each of the one or more location zones.

In the example method of FIG. 2, determining (210) preferred ringer settings for each of the one or more location zones may be carried out through the use of selection rules that take into account the ringer setting information (216) for each mobile communications device in a particular location zone. Such ringer selection rules may be configured, for example, to select the most commonly used ringer setting amongst the mobile communications devices in a particular location zone as the preferred ringer settings for mobile communications devices in the particular location zone. Alternatively, the ringer selection rules may be configured to select ringer settings utilized by at least a predetermined threshold percentage of the mobile communications devices in a particular location zone as the preferred ringer settings for mobile communications devices in the particular location zone. In the example method of FIG. 2, the ringer selection rules may give heavier weight to the ringer setting information (216) for particular mobile communications devices such as a mobile communications device designated as an administrator device, a device that has recently changed its ringer settings in view of the fact that the ringer settings for such a mobile communications device are being actively monitored, and so on.

Figure 3:
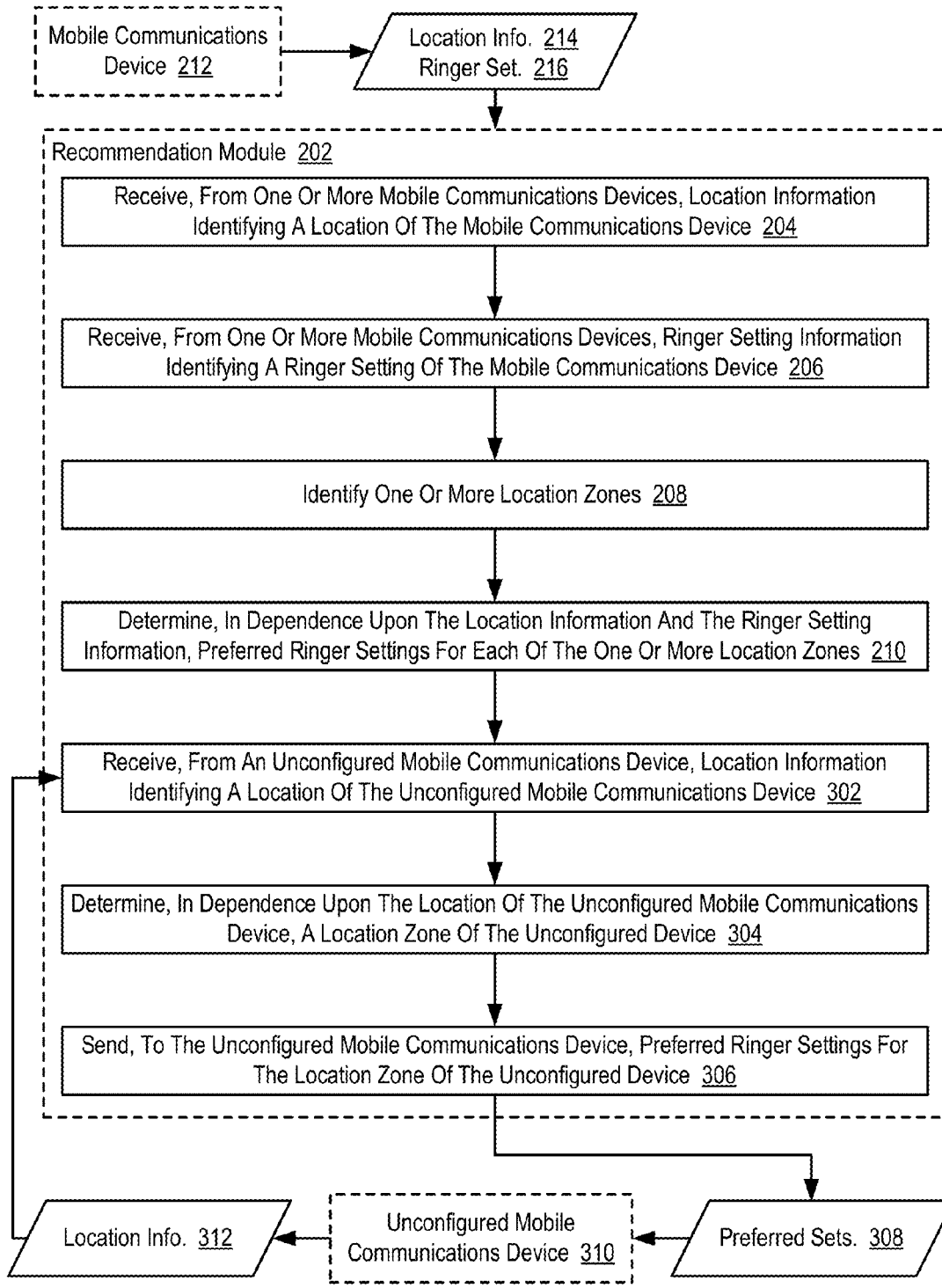
FIG. 3 sets forth a flow chart illustrating an additional example method for recommending preferred ringer settings for a mobile communications device according to embodiments of the present invention.

For further explanation, FIG. 3 sets forth a flow chart illustrating an additional example method for recommending preferred ringer settings for a mobile communications device according to embodiments of the present invention. The example method depicted in FIG. 3 is similar to the example method depicted in FIG. 2, as it also includes receiving (204) location information (214) identifying a location of the mobile communications device (212), receiving (206) ringer setting information (216) identifying a ringer setting of the mobile communications device (212), identifying (208) one or more location zones, and determining (210) preferred ringer settings for each of the one or more location zones in dependence upon the location information (214) and the ringer setting information (216).

The example method depicted in FIG. 3 also includes receiving (302), from an unconfigured mobile communications device (310), location information (312) identifying a location of the unconfigured mobile communications device (310). In the example method of FIG. 3, the unconfigured mobile communications device (310) represents a mobile communications device that has not received an identification of preferred ringer settings for mobile communications devices within the same area that the unconfigured mobile communications device (310) is within. Readers will appreciate that a particular mobile communications device may therefore transition from being a 'configured' mobile communications device to an unconfigured mobile communications device (310) by physically moving between different location zones. In the example method of FIG. 3, the location information (312) identifying a location of the unconfigured mobile communications device (310) may be received (302) from the unconfigured mobile communications device (310) by the unconfigured mobile communications device (310) sending a message that includes the location information (312) to the recommendation module (202), by the recommendation module (202) polling the unconfigured mobile communications device (310) for location information (312), and so on.

The example method depicted in FIG. 3 also includes determining (304), in dependence upon the location of the unconfigured mobile communications device (310), a location zone of the unconfigured mobile communications device (310). As described above, the recommendation module (202) identifies (208) one or more location zones. In order to determine (304) the location zone of the unconfigured mobile communications device (310), the recommendation module (202) may examine the location information (312) received from the unconfigured mobile communications device (310) and compare the location of the unconfigured mobile communications device (310) to the identified location zones to determine whether the unconfigured mobile communications device (310) is located within any of the one or more identified location zones.

The example method depicted in FIG. 3 also includes sending (306), to the unconfigured mobile communications device (312), preferred ringer settings (308) for the location zone of the unconfigured mobile communications device (310). As described above, preferred ringer settings may be determined (210) for each of the one or more identified location zones. In such a way, after the location zone of the unconfigured mobile communications device (310) has been determined (304), the recommendation module (202) may subsequently retrieve the preferred ringer settings for the location zone of the unconfigured mobile communications device (310). The recommendation module (202) may then send (306) the preferred ringer settings (308) for the location zone of the unconfigured mobile communications device (310) to the unconfigured mobile communications device (312). In the example method of FIG. 3, sending (306) the preferred ringer settings (308) for the location zone of the unconfigured mobile communications device (310) to the unconfigured mobile communications device (312) may be carried out, for example by sending the preferred ringer settings (308) to the unconfigured mobile communications device (312) in a message over a data communications network that connects the recommendation module (202) and the unconfigured mobile communications device (310).

Figure 4:
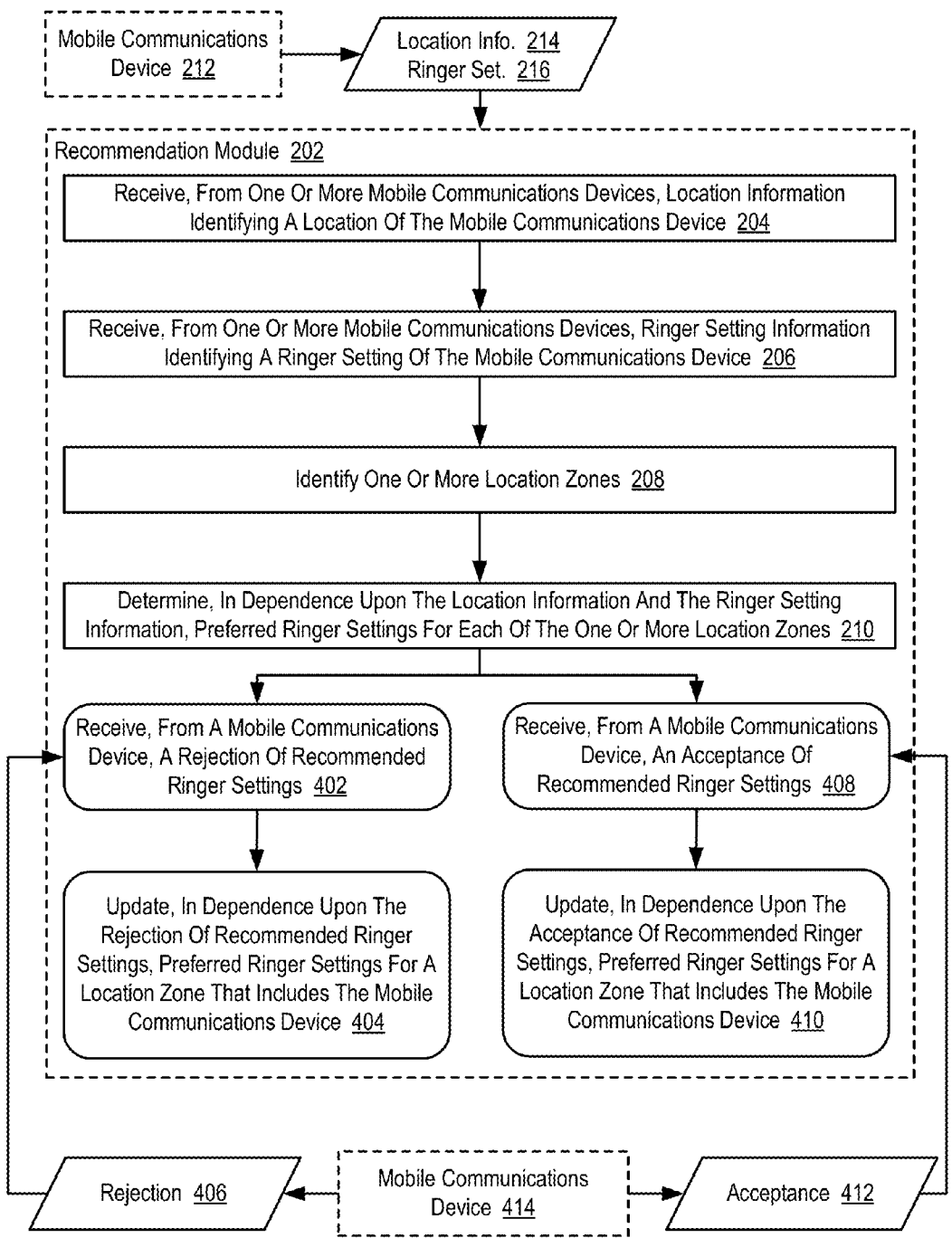
FIG. 4 sets forth a flow chart illustrating an additional example method for recommending preferred ringer settings for a mobile communications device according to embodiments of the present invention.

For further explanation, FIG. 4 sets forth a flow chart illustrating an additional example method for recommending preferred ringer settings for a mobile communications device according to embodiments of the present invention. The example method depicted in FIG. 4 is similar to the example method depicted in FIG. 2, as it also includes receiving (204) location information (214) identifying a location of the mobile communications device (212), receiving (206) ringer setting information (216) identifying a ringer setting of the mobile communications device (212), identifying (208) one or more location zones, and determining (210) preferred ringer settings for each of the one or more location zones in dependence upon the location information (214) and the ringer setting information (216).

As described above with reference to FIG. 3, the recommendation module (202) may send preferred ringer settings (308 of FIG. 3) to an unconfigured mobile communications device (310 of FIG. 3). In other embodiments, preferred ringer settings may be sent to all mobile communications devices in each location zone. As such, any mobile communications device that receives preferred ringer settings from the recommendation module (202) may treat the receipt of such ringer settings as a recommendation from the recommendation module (202) that the recipient mobile communications device adopt the preferred ringer settings, referred to in FIG. 4 as 'recommended ringer settings.' In response to the receipt of such recommended ringer settings, a mobile communications device may choose to accept such a recommendation and adopt the recommended ringer settings, or the mobile communications device may choose to reject such a recommendation and not adopt the recommended ringer settings.

The example method depicted in FIG. 4 includes receiving (402), from a mobile communications device (414), a rejection (406) of recommended ringer settings. In the example method of FIG. 4, receiving (402) the rejection (406) of recommended ringer settings from the mobile communications device (414) may be carried out by the mobile communications device (414) sending a message to the recommendation module (202) indicating that the mobile communications device (414) did not adopt the recommended ringer settings. In such an example, a user of the mobile communications device (414) may reject the recommended ringer settings through the use of a GUI presented by the mobile communications device (414). The GUI presented by the mobile communications device (414) may include, for example, details describing the recommended ringer settings, icons that enable the user to reject or accept the recommended ringer settings, and so on.

The example method depicted in FIG. 4 also includes updating (404), in dependence upon the rejection (406) of recommended ringer settings, preferred ringer settings for a location zone that includes the mobile communications device (414). As described above, determining (210) preferred ringer settings for each of the one or more location zones may be carried out through the use of selection rules. In the example method of FIG. 4, updating (404) preferred ringer settings for a location zone that includes the mobile communications device (414) may also utilize such selection rules. Updating (404) preferred ringer settings for a location zone that includes the mobile communications device (414) may be done in dependence upon the rejection (406) of recommended ringer settings, such that the rejection (406) of the recommended ringer settings represents an additional mobile communications device in the location zone that is making use of ringer settings other than the recommended ringer settings. The selection rules may even assign a greater weight to the ringer settings of the mobile communications device (414) in view of the fact that the user of the mobile communications device (414) actively evaluated and rejected the recommended ringer settings, whereas users of other mobile communications devices may have simply entered into the location zone with preexisting ringer settings intact.

The example method depicted in FIG. 4 can alternatively include receiving (408), from the mobile communications device (414), an acceptance (412) of recommended ringer settings. In the example method of FIG. 4, receiving (408) an acceptance (412) of recommended ringer settings from the mobile communications device (414) may be carried out by the mobile communications device (414) sending a message to the recommendation module (202) indicating that the mobile communications device (414) adopted the recommended ringer settings. In such an example, a user of the mobile communications device (414) may accept the recommended ringer settings through the use of a GUI presented by the mobile communications device (414). The GUI presented by the mobile communications device (414) may include, for example, details describing the recommended ringer settings, icons that enable the user to reject or accept the recommended ringer settings, and so on.

The example method depicted in FIG. 4 can also include updating (410), in dependence upon the acceptance (412) of recommended ringer settings, preferred ringer settings for a location zone that includes the mobile communications device (414). As described above, determining (210) preferred ringer settings for each of the one or more location zones may be carried out through the use of selection rules. In the example method of FIG. 4, updating (410) preferred ringer settings for a location zone that includes the mobile communications device (414) may also utilize such selection rules. Updating (410) preferred ringer settings for a location zone that includes the mobile communications device (414) may be done in dependence upon the acceptance (412) of recommended ringer settings, such that the acceptance (412) of the recommended ringer settings represents an additional mobile communications device in the location zone that is making use of ringer settings other than the recommended ringer settings. The selection rules may even assign a greater weight to the ringer settings of the mobile communications device (414) in view of the fact that the user of the mobile communications device (414) actively evaluated and accepted the recommended ringer settings, whereas users of other mobile communications devices may have simply entered into the location zone with preexisting ringer settings intact.

Figure 5:
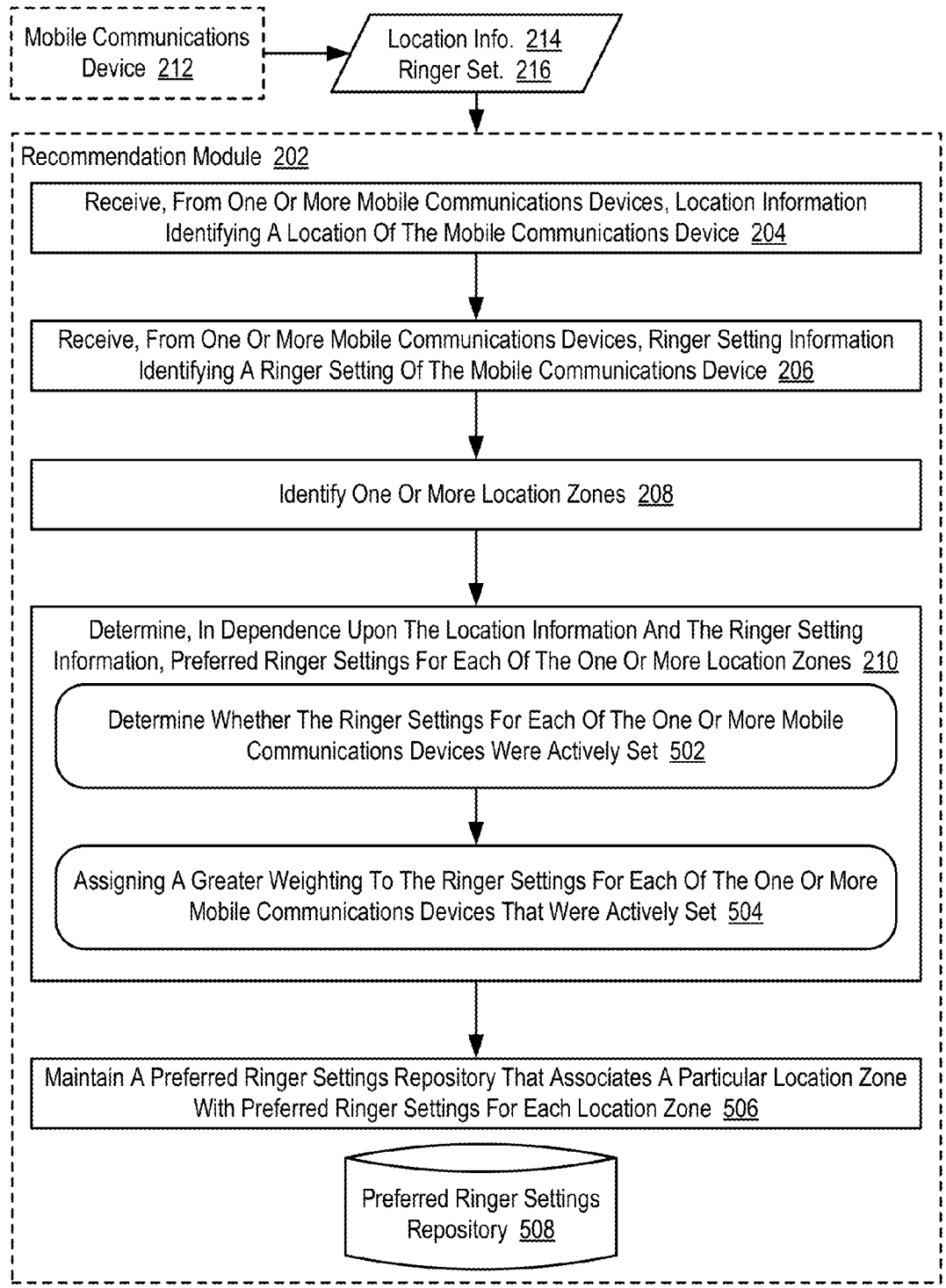
FIG. 5 sets forth a flow chart illustrating an additional example method for recommending preferred ringer settings for a mobile communications device according to embodiments of the present invention.

For further explanation, FIG. 5 sets forth a flow chart illustrating an additional example method for recommending preferred ringer settings for a mobile communications device according to embodiments of the present invention. The example method depicted in FIG. 5 is similar to the example method depicted in FIG. 2, as it also includes receiving (204) location information (214) identifying a location of the mobile communications device (212), receiving (206) ringer setting information (216) identifying a ringer setting of the mobile communications device (212), identifying (208) one or more location zones, and determining (210) preferred ringer settings for each of the one or more location zones in dependence upon the location information (214) and the ringer setting information (216).

In the example method depicted in FIG. 5, determining (210) preferred ringer settings for each of the one or more location zones in dependence upon the location information (214) and the ringer setting information (216) can include determining (502) whether the ringer settings for each of the one or more mobile communications devices (212) were actively set. In the example method of FIG. 5, ringer settings are 'actively set' for a mobile communications device, for example, when a user of a particular mobile communications device accepts or rejects recommended ringer settings as described above with reference to FIG. 4, when a user of a mobile communications device changes the ringer settings of the mobile communications device without prompting, or in other situations where the user of the mobile communications device indicates that the ringer settings for a particular mobile communications device have been selected rather than merely carried over from a previous setting. In such an example, determining (502) whether the ringer settings for each of the one or more mobile communications devices (212) were actively set may be carried out by receiving a rejection or acceptance of recommended settings, by receiving new ringer settings from a mobile communications device that had previously communicated its ringer settings to the recommendation module (202), and so on.

In the example method depicted in FIG. 5, determining (210) preferred ringer settings for each of the one or more location zones in dependence upon the location information (214) and the ringer setting information (216) can also include assigning (504) a greater weighting to the ringer settings for each of the one or more mobile communications devices (212) that were actively set. As described above, determining (210) preferred ringer settings for each of the one or more location zones may be carried out through the use of selection rules. The selection rules may be configured such that a greater weight is assigned (504) to those to the ringer settings of the mobile communications devices for which the ringer settings were actively set, as the ringer settings which were actively set were evaluated and accepted, whereas users of other mobile communications devices may have simply entered into the location zone with preexisting ringer settings intact.

The example method of FIG. 5 also includes maintaining (506) a preferred ringer settings repository (508). In the example method of FIG. 5, each entry in the referred ringer settings repository (508) can associate a particular location zone with preferred ringer settings for each location zone. Such a preferred ringer settings repository (508) may be embodied, for example, as a database, as a table, or as other data structures stored in computer memory.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus comprising a computer processor and a computer memory operatively coupled to the computer processor, the computer memory having disposed within it computer program instructions that, when executed by the computer processor, cause the apparatus to carry out the steps of:

receiving, from a plurality of mobile communications devices, location information identifying a location of the plurality of mobile communications devices;

receiving, from the plurality of mobile communications devices, ringer setting information identifying a ringer setting of the plurality of mobile communications devices;

identifying, in dependence upon the location information, one or more location zones, wherein identifying the one or more location zones comprises identifying an area in which the plurality of mobile communications devices have similar ringer settings;

determining, in dependence upon the location information and the ringer setting information, preferred ringer settings for each of the one or more location zones, wherein the preferred ringer settings for each of the one or more location zones is determined using ringer selection rules that use the ringer settings for each of the plurality of mobile communications devices in each of the one or more location zones, wherein determining preferred ringer settings further comprises;

determining whether the ringer settings for each of the plurality of mobile communications devices were actively set; and assigning a greater weighting to the ringer settings that were actively set; and applying, by a particular mobile communications device, preferred ringer settings for a particular one of the locations zones responsive to determining by the particular mobile communications device that the particular mobile communications device is in the particular location zone.

2. The apparatus of claim 1 further comprising computer program instructions that, when executed by the computer processor, cause the apparatus to carry out the steps of:

receiving, from an unconfigured mobile communications device, location information identifying a location of the unconfigured mobile communications device;

determining, in dependence upon the location of the unconfigured mobile communications device, a location zone of the unconfigured mobile communications device; and sending, to the unconfigured mobile communications device, preferred ringer settings for the location zone of the unconfigured mobile communications device.

3. The apparatus of claim 1 further comprising computer program instructions that, when executed by the computer processor, cause the apparatus to carry out the steps of:

receiving, from a mobile communications device, a rejection of recommended ringer settings; and updating, in dependence upon the rejection of recommended ringer settings, preferred ringer settings for a location zone that includes the mobile communications device.

4. The apparatus of claim 1 further comprising computer program instructions that, when executed by the computer processor, cause the apparatus to carry out the steps of:

receiving, from a mobile communications device, an acceptance of recommended ringer settings; and updating, in dependence upon the acceptance of recommended ringer settings, preferred ringer settings for a location zone that includes the mobile communications device.

5. The apparatus of claim 1 further comprising computer program instructions that, when executed by the computer processor, cause the apparatus to carry out the step of maintaining a preferred ringer settings repository, the preferred ringer settings repository associating a particular location zone with preferred ringer settings for each location zone.

6. A computer program product including a non-transitory computer readable medium, the computer program product comprising computer program instructions that, when executed, cause a computer to carry out the steps of:
- receiving, from a plurality of mobile communications devices, location information identifying a location of the plurality of mobile communications devices;
- receiving, from the plurality of mobile communications devices, ringer setting information identifying a ringer setting of the plurality of mobile communications devices;
- identifying, in dependence upon the location information, one or more location zones, wherein identifying the one or more location zones comprises identifying an area in which the plurality of mobile communications devices have similar ringer settings;
- determining, in dependence upon the location information and the ringer setting information, preferred ringer settings for each of the one or more location zones, wherein the preferred ringer settings for each of the one or more location zones is determined using ringer selection rules that use the ringer settings for each of the plurality of mobile communications devices in each of the one or more location zones, wherein determining preferred ringer settings further comprises;
    - determining whether the ringer settings for each of the plurality of mobile communications devices were actively set; and
    - assigning a greater weighting to the ringer settings that were actively set and
- applying, by a particular mobile communications device, preferred ringer settings for a particular one of the locations zones responsive to determining by the particular mobile communications device that the particular mobile communications device is in the particular location zone.

7. The computer program product of claim 6 further comprising computer program instructions that, when executed, cause a computer to carry out the steps of:
- receiving, from an unconfigured mobile communications device, location information identifying a location of the unconfigured mobile communications device;
- determining, in dependence upon the location of the unconfigured mobile communications device, a location zone of the unconfigured mobile communications device; and
- sending, to the unconfigured mobile communications device, preferred ringer settings for the location zone of the unconfigured mobile communications device.

8. The computer program product of claim 6 further comprising computer program instructions that, when executed, cause a computer to carry out the steps of:
- receiving, from a mobile communications device, a rejection of recommended ringer settings; and
- updating, in dependence upon the rejection of recommended ringer settings, preferred ringer settings for a location zone that includes the mobile communications device.

9. The computer program product of claim 6 further comprising computer program instructions that, when executed, cause a computer to carry out the steps of:
- receiving, from a mobile communications device, an acceptance of recommended ringer settings; and
- updating, in dependence upon the acceptance of recommended ringer settings, preferred ringer settings for a location zone that includes the mobile communications device.

10. The computer program product of claim 6 further comprising computer program instructions that, when executed, cause a computer to carry out the steps of maintaining a preferred ringer settings repository, the preferred ringer settings repository associating a particular location zone with preferred ringer settings for each location zone.

11. The computer program product of claim 6 wherein the computer readable medium comprises a storage medium.

* * * * *